May 23, 1950 E. F. STOVER 2,509,078
FLUID METER
Filed June 29, 1945 2 Sheets-Sheet 1

INVENTOR.
EMORY FRANK STOVER
BY
B. T. Wobensmith 2nd
attorney

May 23, 1950  E. F. STOVER  2,509,078
FLUID METER
Filed June 29, 1945  2 Sheets-Sheet 2
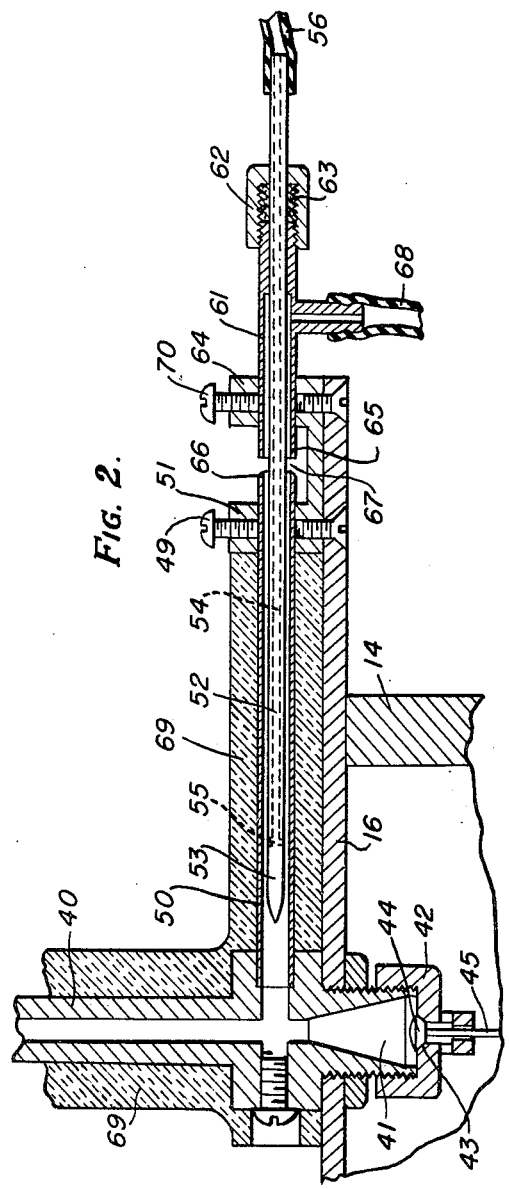
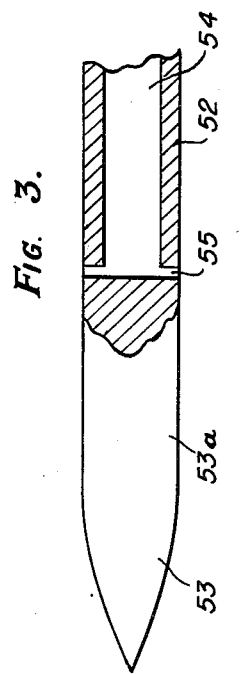
INVENTOR.
EMORY FRANK STOVER
BY
Attorney Patented May 23, 1950

2,509,078

UNITED STATES PATENT OFFICE 2,509,078

FLUID METER

Emory Frank Stover, Wynnewood, Pa.

Application June 29, 1945, Serial No. 602,183

16 Claims. (Cl. 73—205)

This invention relates to fluid meters and more particularly to fluid meters for use in connection with primary metering elements such as Venturi tubes, orifices, nozzles and Pitot tubes.

The invention further relates to apparatus for measuring and indicating variations in conditions and forces where it is desired to obtain a square root relation of the condition or force to be measured.

It is the principal object of the present invention to provide a fluid meter for directly obtaining a square root relation of a differential pressure or force.

It is a further object of the present invention to provide a fluid meter for directly obtaining a relation which is a slight departure from the square root relation of a differential pressure or force.

It is a further object of the present invention to provide apparatus employing laminar flow of a pilot fluid in a tube with provisions for varying the effective length of the tube.

It is a further object of the present invention to provide apparatus employing laminar flow of a pilot fluid through a tube which is readily adaptable for different maximum rates of flow in primary elements of different ratios.

It is a further object of the present invention to provide improved apparatus for applying an initial force to a responsive element in opposition to a static pressure produced by laminar flow for obtaining an indication directly proportional to the initial force.

It is a further object of the present invention to provide a fluid meter capable of operating at the optimum conditions of fluid viscosity of a pilot fluid.

Other objects of the invention will be apparent from the specification and claims.

The nature and characteristic features of the invention will be more readily understood from the following description, taken in connection with the accompanying drawings forming part hereof, in which:

Fig. 2 is an enlarged central sectional view of a portion of the meter illustrated in Fig. 1 and showing certain details of the meter, and Fig. 3 is a fragmentary vertical sectional view, further enlarged, through a rod or tube forming part of the meter in accordance with the present invention.

Figure 1:
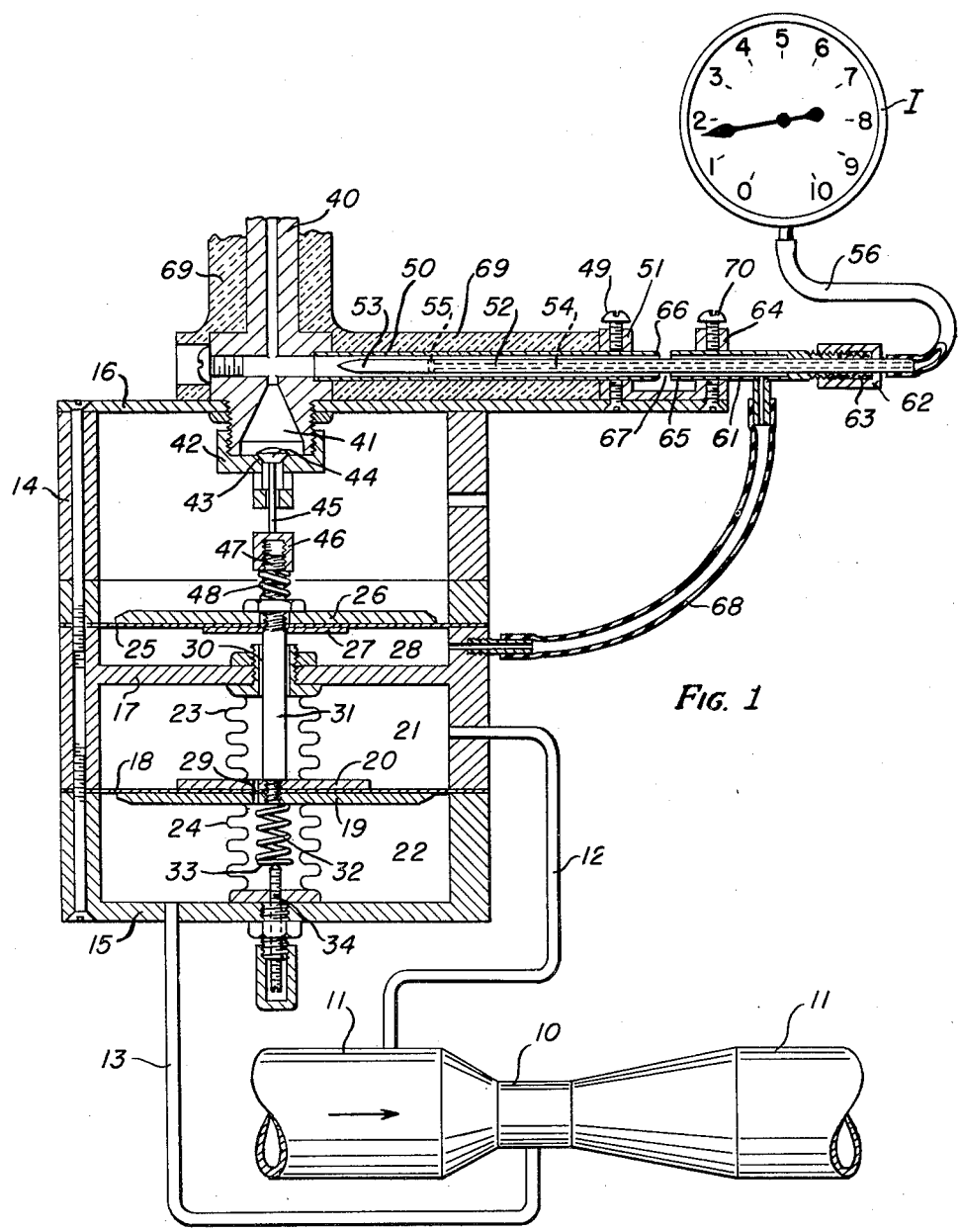
Figure 1 is a vertical central sectional view of a fluid meter embodying the main features of the present invention.

It should, of course, be understood that the description and drawings herein are illustrative merely, and that various modifications and changes may be made in the structure disclosed without departing from the spirit of the invention.

Referring more particularly to the drawings in which a preferred embodiment of the invention is illustrated, a primary metering device is shown which is adapted for obtaining a differential pressure or force derived from fluid flow through conduits in which Venturi tubes, orifices, nozzles, or Pitot tubes are connected, or from Pitot tubes employed for obtaining the speed of ships, airplanes, or the like. For purposes of explanation the primary metering device is shown in the form of a Venturi tube 10 connected in a conduit 11 for measuring the rate of flow of fluid through the conduit 11.

The upstream or high pressure side of the primary metering device 10 has a pipe 12 connected thereto and the downstream or lower pressure portion of the primary metering device 10 has a pipe 13 connected thereto.

A sectional casing 14 is provided having a lower end wall 15, an upper end wall 16, and a transverse intermediate wall 17. In the space between the wall 15 and the wall 17 a flexible diaphragm 18 is provided supported by a plate 19 and clamped by a plate 20. The diaphragm 18 separates a chamber 21 from a chamber 22, in the casing 14. The chamber 21 has the pipe 12 connected thereto and the chamber 22 has the pipe 13 connected thereto so that the high and lower pressures respectively from the primary metering device are effective therein. On each side of the diaphragm 18 flexible metallic bellows 23 and 24, of equal effective area are provided. The bellows 24 is secured to the wall 15 at one end and secured to the diaphragm 18 at the other end, in fluid tight relationship. The bellows 23 is secured at one end to the diaphragm 18 and at the other end to the wall 17, in fluid tight relationship.

In the casing 14 and above the wall 17 a diaphragm 25 is provided, supported by a plate 26 and clamped by a plate 27. The space between the diaphragm 25 and the wall 17, within the casing 14, provides a pressure chamber 28 for purposes to be explained. The interior of the bellows 23 is preferably in communication with the interior of the bellows 24 by means of a port 29 extending through the diaphragm 18 and the interior of the bellows 23 is in communication with the chamber 28 through a passageway 30 through which a valve rod 31 extends. The valve rod 31 is secured to the diaphragm 18 for movement therewith and is secured to the diaphragm 25 for movement therewith.

Within the bellows 24 an adjusting spring 32 is provided, bearing against the lower end of the diaphragm 18 and against a spring plate 33, an adjusting screw 34 being in engagement with the lower end of the spring plate 33. The spring 32 is adapted to be adjusted to apply an upward force on the movable unit comprising the diaphragm 18, the rod 31 and the diaphragm 25 for overcoming the effect of the weight of these parts.

The casing 14 preferably has mounted on the upper wall 16 thereof, a straight bore tube 40 which is connected to a suitable source of pressure fluid at a regulated pressure, the pressure fluid preferably being compressed air. The lower end of the tube 40 is enlarged to provide an expanding area chamber 41. The lower end of the chamber 41 is provided with a closure 42 having a valve seating portion 43 formed therein. A valve seating member 44 is provided which is adapted to be spaced with respect to the port 43 for controlling the discharge of pilot fluid as hereinafter explained. The valve seating member 44 has a stem 45 bearing on an adjusting collar 46 having internal threads in engagement with threads 47 on the upper end of the rod 31. A retainer spring 48 is interposed between the adjusting collar 46 and the diaphragm 25.

A tube 50 is provided, suported and adjustably clamped by a fastener 49 at its outer end in a tube support block 51. The interior of the tube 50 is in communication with the tube 40 and a tubular rod 52 extends within the tube 50.

The tubular rod 52 is provided with a streamlined tip 53 having a straight portion 53a of a length sufficient to establish laminar flow. The tubular rod 52 has an interior bore 54. A piezometer gap or opening 55, of a size such as to avoid disturbance of the laminar flow is provided in communication with the bore 54 for transmitting the pressure at the gap 55.

The internal diameter of the tube 50 and the external diameter of the tubular rod 52 are preferably such as to provide an annular space therebetween which has a radial width such as to insure laminar flow of the pilot fluid passing therealong.

The bore 54 is connected, preferably by a flexible conduit 56, to a suitable pressure responsive device or instrument I, a pressure gauge for indicating being illustrated.

The tubular rod 52 preferably extends through a tube 61, a gland 62 and packing 63 being provided for adjustably positioning the tubular rod 52 with respect to the tube 50. The tube 61 is supported and adjustably clamped by a fastener 70 in a tube support block 64 in axial alinement with the tube 50. The tube 61 functions as an impact tube and is adapted to have the outer terminal end 65 thereof positioned with respect to the outer terminal end 66 of the tube 50 to provide a gap 67 of the desired length. The end 66 of the tube 50 is preferably beveled to avoid any obstruction of the flow of the fluid discharging from the tube 50.

The variation of the length of the gap 67 permits or regulated departure from the exact square root function. The discharge of pilot fluid from the laminar flow tube 50 against the impact end 65 of the tube 61 creates a static pressure in the space in the interior of the tube 61 outside the tubular rod 52. This static pressure is proportional to the square of the velocity of the fluid impinging upon the tube 61. The interior space is in communication through a conduit 68 with the chamber 28 so that this static pressure is effective in that chamber.

The exterior of the straight bore tube 40 and of the laminar flow tube 50 are preferably covered with heat insulating material 69 for purposes to be explained.

In laminar flow all fluid particles move in parallel lines without crosswise mixing, and the pressure loss or drop, resulting from laminar flow, is directly proportional to the average velocity in the cross section of the tube.

Fluid flowing through the primary metering device 10 produces a higher static pressure which is effective through the pipe 12 in the chamber 21 and a lower static pressure which is effective through the pipe 13 in the chamber 22, the differential of these pressures acting on the diaphragm 18 and thereby exerting a control effect on the pilot valve 44 through the rod 31.

Pilot fluid is delivered at regulated pressure through the tube 40, and a portion thereof is discharged in accordance with the positioning of the valve 44 with respect to the seat 43. The other portion of the pilot fluid passes into the tube 50 where it is guided by the straight portion 53 of the tubular rod 52 and laminar flow established. The fluid, with laminar flow, passes along the annular space between the tube 50 and the tubular rod 52 and produces a pressure drop in the portion of the tube 50 between the piezometer gap 55 and the terminal end 66 of the tube 50. This pressure drop, for a particular setting of the gap 67, is a first power function of the velocity of the pilot fluid in the laminar flow tube and this pressure at the gap 55 is effective through the bore 54 and the conduit 56 and may be read on the gauge I.

The fluid discharging at the terminal end 66 of the laminar flow tube is effective in the impact tube 61 and sets up within the tube 61 a pressure which is a second power function of its velocity. The pressure effective within the tube 61 is transmitted through the conduit 68 to the chamber 28 where it is applied against the diaphragm 25. The force applied in the chamber 28 against the diaphragm 25, which diaphragm 25 is connected to the rod 31, is in opposition to the force applied against the diaphragm 18 from the primary metering device 10. The differential effective from the primary metering device 10 on the diaphragm 18 is proportional to the second power of the fluid flow to be measured.

For a particular flow a differential will be established effective against the diaphragm 18 and opposing this for balanced conditions and for equilibrium an equal force will be exerted in the chamber 28 against the diaphragm 25. The pilot valve 44 will be positioned to control the discharge through the port 43. The pressure of the pilot fluid available for laminar flow is thus determined and this pressure in turn determines the pressure applied in the chamber 28 to maintain equilibrium conditions. Upon a change in the rate of flow the position of the pilot valve 44 will be changed, with consequent change of the pressure of the pilot fluid available for laminar flow and with change of the pressure in the chamber 28 to balance or equalize the differential pressure from the primary metering device 10.

The reading on the pressure gauge I as related to the flow to be measured can be expressed as follows:

$$KR_I^2 \times A_a = A_b K_1 q^2$$

in which:

$R_I$ = gage reading;
$A_a$ = area of diaphragm 25;
$A_b$ = area of diaphragm 18;
$q$ = rate of flow to be measured; and
$K$ and $K_1$ represent constants covering such factors as densities of the fluid flowing and of the pilot fluid, gauge scale, etc.

From this it will be seen that $$R_I = q \sqrt{\frac{A_b K_1}{A_a K}}$$

or $$R_I = K_2 q$$

The gauge reading at the gauge I, on a scale of uniform divisions, is accordingly a direct measure of the flow to be measured.

The length of the laminar passage may be varied as desired by loosening the gland 62 and moving the tubular rod 52 to position the gap 55 the desired distance from the terminal end 66 of the tube 50. This adjustment permits of making the maximum reading of the gage I agree with different maximum rates of flow in the primary metering device 10, or agree with the same maximum flow in primary metering device 10 of different ratio.

The gap between the terminal end 66 of the laminar flow tube 50 and the terminal end 65 of the impact tube 61 may also be varied by loosening the fastener 70 in the tube support 64 and sliding the impact tube 61 to the position desired. This adjustment permits of accommodation to primary metering devices 10 which depart slightly from the exact second power relation between the differential produced and the rate of flow corresponding thereto.

The kinematic viscosity of the pilot fluid increases with the temperature and the curve of these quantities is flatter for lower temperatures. In order to take advantage of the reduced temperature attendant upon the expansion of the pilot fluid for delivery to the bore 40, the heat insulating material 69 covers the tube 40 and the tube 50 to retain the lower temperature. This reduces the creep which may follow ambient temperature effects.

I claim:

1. In a fluid meter, a laminar flow tube connected to a source of pressure fluid, means for varying the effective length of said tube, an expansible chamber having a movable wall portion, an impact tube positioned adjacent the discharge end of said laminar flow tube and in communication with said chamber, means for applying a force to be measured against said movable wall portion, valve means actuated by the positioning of said movable wall portion for varying the rate of flow through said laminar flow tube and for maintaining the forces acting upon said movable wall portion in balance, and means responsive to the pressure of fluid in said laminar flow tube.

2. In a fluid meter, a laminar flow tube connected to a source of pressure fluid, an expansible chamber having a movable wall portion, an impact tube positioned adjacent the discharge end of said laminar flow tube and in communication with said chamber, means for applying a force to be measured against said movable wall portion, means controlled by said force for controlling the pressure of the fluid from said source supplied to said tube, means for permitting varying the distance between said impact tube and the discharge end of the laminar flow tube, and means responsive to the pressure of fluid in said laminar flow tube.

3. In a fluid meter, a tube connected to a source of pressure fluid, mounting means for said tube, a rod positioned coaxially within said tube with the adjacent surfaces of the tube and of the rod closely spaced to provide a passageway for laminar flow, mounting means for said rod disposed beyond the discharge end of said tube, at least one of said mounting means permitting relative positioning of said rod and said tube longitudinally for determining the effective length of the laminar flow passageway, means actuated by the flow of said fluid through said tube for producing a pressure proportional to the square of said flow, and means responsive to the pressure of fluid in said laminar flow passageway for producing an effect proportional to said flow.

4. In a fluid meter, a tube connected to a source of pressure fluid, a rod positioned coaxially within said tube with the adjacent surfaces of the tube and of the rod closely spaced to provide a passageway for laminar flow, said rod having a pressure take-off opening therein, means for permitting adjustable positioning of said rod and said tube for determining the effective length of the laminar flow passageway, means actuated by the flow of said fluid through said tube for producing a pressure proportional to the square of said flow, and means responsive to the pressure of fluid in said laminar flow passageway in communication with said opening for producing an effect proportional to said flow.

5. In a fluid meter, a tube connected to a source of pressure fluid, a rod positioned coaxially within said tube with the adjacent surfaces of the tube and of the rod closely spaced to provide a passageway for laminar flow, said rod having a piezometer opening therein and an internal passageway in communication with said opening, means responsive to the flow of said fluid through said tube for producing a pressure proportional to the square of said flow, and means in communication with said internal passageway for producing an effect proportional to said flow.

6. In a fluid meter, a tube connected to a source of pressure fluid, a rod positioned coaxially within said tube with the internal surface of the tube and the external surface of the rod closely spaced to provide a passageway for laminar flow, said rod having a piezometer opening in the external surface thereof, and an internal passageway therethrough in communication with said opening, means for permitting adjusting said rod longitudinally with respect to said tube for varying the effective length of the laminar flow passageway, means responsive to the flow of said fluid through said tube for producing a pressure proportional to the square of said flow, and pressure responsive means in communication with said internal passageway responsive to the pressure of fluid in said laminar flow passageway.

7. In a fluid meter, a tube connected to a source of pressure fluid, means for controlling the pressure of the fluid from said source supplied to said tube, a rod positioned coaxially within said tube with the adjacent surfaces of the tube and of the rod closely spaced to provide a passageway for laminar flow, an expansible chamber having a movable portion connected to said controlling means, an impact tube in communication with said chamber and having an open end in spaced relation to the discharge end of the first tube, adjustable means for permitting varying the positioning of said open and said discharge ends of said tubes, and movable means responsive to the pressure of fluid in the laminar flow section of said first tube.

8. In a fluid meter, a tube connected to a source of pressure fluid, means for controlling the pressure of the fluid from said source supplied to said tube, a rod positioned coaxially within said tube with the internal surface of the tube and the external surface of the rod closely spaced to provide a passageway for laminar flow, an expansible chamber having a movable portion connected to said controlling means, an impact tube in communication with said chamber and having an open end in spaced relation to the discharge end of the first tube, said rod extending within said impact tube, means for permitting adjusting said rod longitudinally with respect to said first tube for determining the effective length of the laminar flow passageway, adjustable means for varying the positioning of said open and said discharge ends of said tubes, and movable means responsive to the pressure of fluid in the laminar flow passageway.

9. In a fluid meter, a tube connected to a source of pressure fluid, means for controlling the pressure of the fluid from said source supplied to said tube, a rod positioned coaxially within said tube with the adjacent surfaces of the tube and of the rod closely spaced to provide a passageway for laminar flow, said rod having a piezometer opening therein and an internal passageway in communication with said opening, an expansible chamber having a movable portion connected to said controlling means, an impact tube in communication with said chamber and having an open end in spaced relation to the discharge end of the first tube, said rod extending within said impact tube, means for permitting adjusting said rod longitudinally with respect to said first tube for determining the effective length of the laminar flow passageway, and means responsive to the pressure of fluid in the laminar flow passageway.

10. In a fluid meter, a laminar flow tube connected to a source of pressure fluid, means for controlling the pressure of the fluid supplied to said tube, means for varying the effective length of said laminar flow tube, an expansible chamber having a movable portion connected to said controlling means, an impact tube in communication with said chamber and having an open end in spaced relation to the discharge end of the laminar flow tube, means for permitting varying the spacing of said open and said discharge ends of said tubes and means responsive to the pressure of fluid in the laminar flow tube for producing an effect proportional to a fractional power of the flow through said laminar flow tube.

11. In a fluid meter, a laminar flow tube connected to a source of pressure fluid, means for controlling the pressure of the fluid supplied to said laminar flow tube, an expansible chamber having a movable portion connected to said controlling means, a Pitot tube in communication with said chamber and having an open end in spaced relation to the discharge end of the laminar flow tube, means for permitting varying the spacing of said open and said discharge ends of said tubes, and means responsive to the pressure of fluid in the laminar flow tube for producing an effect proportional to a fractional power of the pressure in said expansible chamber.

12. In a fluid meter, including a fluid supply tube connected to a source of pressure fluid, a laminar flow tube connected to said supply tube, means for controlling the pressure of the fluid supplied to said laminar flow tube, an expansible chamber having a movable wall portion connected to said controlling means, an impact tube in communication with said chamber and positioned adjacent the discharge end of said laminar flow tube, and means on said supply tube and said laminar flow tube for preventing heat absorption by the pressure fluid.

13. In a fluid meter, a movable wall portion responsive to a force to be measured, an expansible chamber having a second movable wall portion in alinement with and connected to said first mentioned wall portion, a laminar flow tube connected to a source of pressure fluid, means for varying the rate of flow through said laminar flow tube including valve means for controlling the discharge of fluid supplied from said source, operating connections between said valve means and said movable wall portions, an impact tube positioned adjacent the discharge end of said laminar flow tube and in communication with said expansible chamber, and indicating means responsive to the pressure of fluid in said laminar flow tube.

14. In a fluid meter, a tube connected to a source of pressure fluid, a tubular member positioned coaxially within said tube with the adjacent surfaces of the tube and of the tubular member closely spaced to provide a passageway for laminar flow, means for positioning said tubular member longitudinally with respect to said tube for determining the effective length of the laminar flow passageway, means actuated by the flow of said fluid through said tube for producing a pressure proportional to the square of said flow, and means in communication with the interior of said tubular member responsive to the pressure drop through said laminar flow passageway for producing an effect proportional to said flow.

15. In a fluid meter, a tube connected to a source of pressure, a tubular member positioned coaxially within said tube with the adjacent surfaces of the tube and of the tubular member closed spaced to provide a passageway for laminar flow, means beyond the discharge end of said tube for supporting said tubular member at its outer end portion, said tubular member having an internal end portion for setting up laminar flow in said passageway, and means in communication with the interior of said tubular member responsive to the pressure of fluid in said laminar flow passageway.

16. In a fluid meter, a tube connected to a source of pressure fluid, a tubular member positioned coaxially within said tube with the internal surface of the tube and the external surface of the tubular member closely spaced to provide a passageway for laminar flow, the outer end portion of said tubular member extending beyond the discharge end of said tube, said tubular member having an internal end portion for setting up laminar flow in said passageway, mounting means in engagement with said outer end portion for permitting adjusting said tubular member longitudinally with respect to said tube for varying the effective length of the laminar flow passageway, and means in communication with the interior of said tubular member responsive to the pressure of fluid in said laminar flow passageway.

EMORY FRANK STOVER.

REFERENCES CITED

The following references are of record in the file of this patent:

UNITED STATES PATENTS

| Number | Name | Date |
|---|---|---|
| 1,913,860 | Spink | June 13, 1933 |
| 1,972,054 | Moller | Aug. 28, 1934 |
| 2,044,806 | Naiman | June 23, 1936 |
| 2,163,730 | Goetzl | June 27, 1939 |
| 2,212,186 | Ricardo et al. | Aug. 20, 1940 |
| 2,297,408 | Hardebeck | Sept. 29, 1942 |
| 2,344,943 | Gooden | Mar. 28, 1944 |